United States Patent [19]

Steininger

[11] Patent Number: 4,946,635

[45] Date of Patent: Aug. 7, 1990

[54] METHOD FOR THE CONTINUOUS PRODUCTION OF CHIP, FIBER-AND SIMILAR BOARDS

[75] Inventor: Hans-Peter Steininger, Springe, Fed. Rep. of Germany

[73] Assignee: Wilheim Mende GmbH & Co., Gittelde, Fed. Rep. of Germany

[21] Appl. No.: 202,140

[22] Filed: Jun. 3, 1988

Related U.S. Application Data

[63] Continuation-in-part of Ser. No. 921,159, Oct. 20, 1986, abandoned.

[30] Foreign Application Priority Data

Oct. 30, 1985 [DE] Fed. Rep. of Germany ....... 3538531

[51] Int. Cl.[5] .............................................. B29C 43/48

[52] U.S. Cl. .................................... 264/120; 264/109; 425/373

[58] Field of Search ....................... 264/109, 120, 119; 425/373, 83.1

[56] References Cited

U.S. PATENT DOCUMENTS

| | | | |
|---|---|---|---|
| 3,734,669 | 5/1973 | Ettel | 425/373 |
| 3,737,351 | 6/1973 | Ettel | 425/83.1 |
| 3,782,875 | 1/1974 | Olschewski | 425/373 |
| 3,874,962 | 4/1975 | Gersbeck | 264/109 |
| 4,097,640 | 6/1978 | Curry | 264/120 |

OTHER PUBLICATIONS

Einheiten und Grossenarten Der Naterwissenschafter; 1964, p. 189.

Tables of Physical and Chemical Constants; Longman, p. 9.

*Primary Examiner*—Jay H. Woo

*Assistant Examiner*—Jeremiah F. Durkin, II

*Attorney, Agent, or Firm*—Allegretti & Witcoff, Ltd.

[57] ABSTRACT

A method for the continuous production of chip board in which a mixture of cellulose chips and resin binder is compressed against a heated rotating drum by a steel band. A first pressure of 250–325 kilopond per centimeter (1 kp=1 kgf) is applied to the mixture at a first position on the heated drum. A second pressure of 400–475 kp/cm is applied at a second position to compress the mixture to the final thickness as the binder hardens and binds the chips.

5 Claims, 1 Drawing Sheet

METHOD FOR THE CONTINUOUS PRODUCTION OF CHIP, FIBER-AND SIMILAR BOARDS

This application is a continuation-in-part of Ser. No. 921,159 filed Oct. 20, 1986 in the name of Hans-Peter Steininger, now abandoned.

BACKGROUND OF THE INVENTION

The invention relates to a method for the continuous production of chip-, fiber- and similar boards, in which a chip mass formed on a support and made from lignocellulose and/or cellulose-containing chips, fibers and the like is mixed with at least one binding agent, is hot pressed in a calender press having a heated pressure drum encircled on a part of its circumference by a steel band running over guide and pressure cylinders. The pressed board is led off in a continuous length.

PRIOR ART

A method of this kind is disclosed in German specification 21 26 935 for the production of rough chip boards with smooth surface. In this known method, the particular chip mass is compressed at the beginning of the pressing to a lesser thickness than the desired final thickness. In this way, it is said, a single pressing operation provides a good board surface and at the same time the increased compression at the beginning of the pressing provides a better heat transfer in the chip layer as well as a quicker penetration of the heat into the exterior areas of the compressed chip layer.

German specification 27 10 000 discloses a process of this type in which additional auxiliary pressure cylinders are provided in the looping area of the band. These cylinders produce a very high pressure in order to improve the pressing process. They are positioned relatively close behind the first pressing aperture, at which point the chips have not yet attained their desired final temperature and softness. Multiple high pressure cylinders considerably increase the cost of the apparatus.

Ettel, U.S. Pat. No. 3,737,351 discloses a similar method in which the chip mass is compressed several times serially as the mass is carried by a flexible belt surrounding the underside of a large diameter heated press drum. While the product is satisfactory, its density and binding strength is less than desired. Furthermore, because the reticulation of the fibers is not accurately controlled, the spring back of the fibers is excessive and more resin is required to bind the fibers.

THE INVENTION

It is the objective of the invention to further improve, as compared with the prior art, the quality of the particulate board to be produced and at the same time to reduce the consumption of binder and to raise the output of the finished product.

This objective is achieved by the invention as follows: the cellulose chip mass containing resin binder is compressed at the beginning of the pressure slit at a first circumferential position between the drum surface and the steel band, preferably to a value approximately equal to the nominal thickness of the final product, and then enclosed between a heated pressure drum and steel band, while being simultaneously transported long enough for the fiber particles to become completely flexible and for the resin binder to reach the required hardening temperature. The heated fibers expand after initial compression by reason of their inherent ductility or flexibility. Subsequently, at a single second circumferential position on the heated pressure drum, one additional application of pressure is made on the steel band and thus on the chip mass which is being subjected to the radial holding pressure of the steel band. The second circumferential position is located precisely where the fibers have attained a temperature where they are soft and easily compressible, and the resin will harden. The chip mass is then hardened into a ready pressed board length. The pressure at the second circumferential position is greater than that at the first circumferential position.

A surprising improvement in quality along with a reduction in the consumption of the binder is—in contrast to the known methods—the result of the fact that on the one hand, not a superfluous, but preferably only the absolutely required pressure for obtaining the final thickness of the particulate board is applied and, on the other hand, the additional application of pressure is not made on the steel band until the best possible effects of this pressure application are obtained corresponding to the temperature of the chip mass.

The steel band is preferably heated from outside by contact and/or radiant heat in the first circumferential area of the heated pressure drum in which the cellulose particles become flexible or elastic. This makes it possible to obtain an easily measured heat effect on the steel band and also a heating temperature gradient in the particular chip mass which insures that when pressure is applied at the second circumferential position, the most favorable temperature is present in the chip mass, i.e., the chips are completely flexible and easily compressed and the resin is at hardening temperature. At this temperature, the pressure sequence is short and the chips remain in compressed condition. The temperature of the chip mixture at the second circumferential position must be between about 105° and 220° C.

For obtaining a further increase in production along with high quality and low binder consumption, it is advantageous to precompress and/or preheat the chip mass before entrance into the pressure slit, the preheating being done preferably with high frequency energy.

In the execution of the method according to the invention, it is essential that the pressure roller at the second circumferential position be bend resistant. Such a roller produces non-yielding pressure to insure accurate thickness in the product across its entire width during the final hardening of the binder resin. In this connection, it is advantageous that the diameter of such pressure roller be smaller than the diameter of the inlet-side pressure cylinder, because the elastic chip mass heated up to the required hardening temperature of the binder at the second circumferential position is now more readily compressible than at the beginning of the pressure slit. For this reason also, the requirement of bend resistance of the particular pressure roller can be met without special expense.

DETAILED DESCRIPTION

Figure 1:
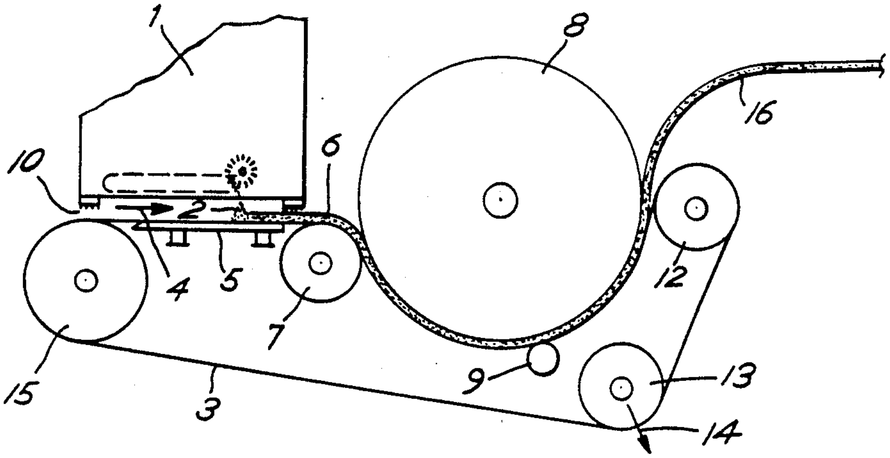

The single view in the drawing illustrates diagrammatically an apparatus useful in practicing the method of the invention. By means of a scattering machine 1, chips 2 combined with a suitable binder such as a urea formaldehyde resin, are scattered on a flexible metal belt 3 which runs continuously in the direction of arrow 4 over the table 5. Radiant or high frequency heaters 10 are mounted beneath machine 1. An entirely uniform layer 6 of chips is placed on the belt. The endless belt 3 advances with the layer 6 onto a pressing drum 8, after it has passed over a heated contact pressure roller 7. The belt 3 encircles the lower portion of heated press drum 8. A single contact pressure roller 9 located at a strategic second circumferential position is employed to press the belt against the pressed drum 8. The belt 3 then runs about the contact pressure roller 12 over the tensioning roller 13, over the deflecting roller 15 and back to the table 5.

The belt 3 is preheated by the heaters 10 and the heated contact pressure roller 7 so that the chips 6 are preheated in the zone of the contact pressure roller 7. The layer 6 entering the gap between the contact pressure roller 7 and the pressed drum 8 takes an obliquely downward incline path.

The contact pressure roller 7, as well as the pressing drum 8, is mounted in fixed position so that between the contact pressure roller 7 and the pressing drum 8, there is formed an exactly defined gap to the size of which the layer of wood chips is compressed. Since the contact pressure roller 7 and the pressed drum 8 are rotary bodies, they can be manufactured and mounted with great precision. The gap formed between them is correspondingly precise.

In order to achieve the advantages of the invention, the following parameters should be observed:

| Parameter | Range | Preferred |
|---|---|---|
| Thickness of the product board | 1-12 mm | 3.2 mm |
| Diameter of the drum 8 | 1.5-5 meters | 3 meters |
| Temperature of the drum 8 | 120°-180° C. | 142° C. |
| Diameter of pressure roller 7 | 1-3 meters | 2 meters |
| Specific pressure imposed by the first pressure roller 7 | 250-325 kp/cm | 290 kp/cm |
| Temperature of pressure roller 7 | 120-220° C. | 167° C. |
| Diameter of second pressure roller 9 | 1-1.8 meters | 1.4 meters |
| Specific pressure of second pressure roller 9 | 400-475 kp/cm | 435 kp/cm |
| Temperature of the second pressure roller 9 | 120-220° C. | 171° C. |
| Specific pressure of steel band 3 | 1-4.5 kp/sq cm | 2.4 kp/sq cm |

Under these conditions the chip mixture is heated in the area of the second pressure roller 9 to a temperature of between 105° and 110° C. The chips at this point are completely flexible and the urea resin used as an adhesive has reached its most favorable condition for wetting the chips. It is important that the resin wet as much of the chip area as possible in order to bind the chips securely together. Under the pressure of the second pressure roller 9 the chips are bonded into a sheet of uniform thickness and the resin hardens within ten seconds after traversing the bight between roller 9 and drum 8.

Using fibers of poplar wood, the gross density of fiber board produced in accordance with the preferred parameters listed above was 780 kg/per square meter compared with 670 kg/per square meter for a chip board made in accordance with the prior art Ettel patent. For a mixture of pine and spruce fibers, the chip board made in accordance with the invention had a gross density of 850 kg/per square meter, whereas the prior art had a gross density of 720 kg/per square meter. The bending strength of that particular mixed fiber board in accordance with the invention was between 30 and 32 $N/mm^2$ compared with 20-23 $N/mm^2$ for the prior art. These results were achieved using from 5-10% less resin. The production rate as compared with the prior art can be increased from about 10 about 20% for a product chip board 3.2 mm thick. Specifically, the production rate was increased from 9.5 meters per minute up to 12 meters per minute.

The springback resilience of the chip board backing during the pressing process by using the procedure of the present invention is 20-30% lower than that of the prior art. This is attributable to applying pressure by roller 9 at the optimum temperature.

What is claimed is:

1. In a method for the continuous production of chip board in which a mixture of cellulose chips and resin binder is compressed against a heated rotating drum by means of a steel band which partially encircles the underside of the drum and applies pressure to said mixture, and in which a first pressure is applied to the mixture at a first circumferential position on the heated drum surface at the entry slit between said drum and said band, and a second greater pressure is applied at a second circumferential position on the heated drum surface downstream of said first circumferential position, the improvement comprising applying at said first circumferential position a pressure of about 250-325 kp/cm (kilopond per centimeter) to achieve a density for heat transfer through said mixture, heating said mixture to a temperature between 105° and 220° C. to render the chips flexible to minimize their resilience and simultaneously to achieve the temperature at which the resin binder is sufficiently fluid to maximize the wetting of the chips, and applying at said second circumferential position a pressure of 400-475 kp/cm to compress said mixture to the final and desired thickness as the binder hardens and intimately binds the chips.

2. The method of claim 1 in which the pressure applied at said second circumferential position is non-yielding.

3. The method of claim 1 in which said rotating drum has a diameter of approximately 3 meters, the chip board product is produced at a speed of 9 to 12 m/min and has a final thickness of between 2.5 and 4.5 mm.

4. The method of claim 1 in which said subsequent hardening step occurs within 10 seconds after the mixture passes said second circumferential position.

5. The method of claim 1 which includes the additional step of preheating and precompressing the mixture prior to passage into said entry slit.

* * * * *